United States Patent [19]

Hagen et al.

[11] 4,158,086
[45] Jun. 12, 1979

[54] FLAMEPROOF THERMOPLASTIC MOLDING MATERIAL

[75] Inventors: Helmut Hagen, Frankenthal; Herbert Naarmann, Watterheim; Klaus Penzien, Frankenthal, all of Fed. Rep. of Germany

[73] Assignee: BASF Aktiengesellschaft, Rheinland, Fed. Rep. of Germany

[21] Appl. No.: 928,814

[22] Filed: Jul. 28, 1978

[30] Foreign Application Priority Data

Aug. 3, 1977 [DE] Fed. Rep. of Germany ....... 2734926

[51] Int. Cl.² .............................................. C08J 9/00
[52] U.S. Cl. ............................ 521/90; 260/45.8 NT; 260/45.8 SN; 260/45.8 NZ; 260/45.8 N; 260/DIG. 24; 260/878 R; 260/880 R; 260/885; 260/881; 521/121; 521/128; 521/907
[58] Field of Search ................ 260/45.8 NT, 45.8 SN, 260/45.8 NZ, 45.8 N; 521/90, 907

[56] References Cited

U.S. PATENT DOCUMENTS

| | | | |
|---|---|---|---|
| 3,843,650 | 10/1974 | Pews | 428/921 |
| 3,950,306 | 4/1976 | Pews et al. | 260/45.8 NT |
| 4,039,538 | 8/1977 | Klinkenberg et al. | 260/45.8 NT |
| 4,046,735 | 9/1977 | Harris | 260/45.8 NT |
| 4,049,622 | 9/1977 | Fleig et al. | 521/907 |
| 4,049,622 | 9/1977 | Fleig et al. | 521/98 |

FOREIGN PATENT DOCUMENTS 950292 2/1964 United Kingdom ...................... 521/907

*Primary Examiner*—Morton Foelak
*Attorney, Agent, or Firm*—Keil & Witherspoon

[57] ABSTRACT

A flameproof thermoplastic molding material based on a styrene polymer and containing from 0.05 to 5 percent by weight of an organic bromine compound as the flameproofing agent, with or without a blowing agent, wherein the bromine compound contains a heterocyclic ring, comprising the group

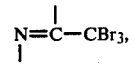

in its molecule, and is heat-stable up to at least 150° C. The preferred bromine compound has the formula

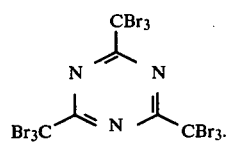

The molding materials may be used for the manufacture of self-extinguishing moldings, eg. foam moldings.

3 Claims, No Drawings

FLAMEPROOF THERMOPLASTIC MOLDING MATERIAL

The use of halogen-containing materials as flameproofing agents for self-extinguishing thermoplastics has been disclosed. To achieve a sufficient effect, relatively large amounts of halogen compound must be added, but these have an adverse effect on the mechanical properties of the plastic. It has also been disclosed that the flame-retardant effect of organic bromine compounds is improved by adding an organic peroxide. However, these have the disadvantage that they are toxic and at times undergo explosive decomposition.

German Laid-Open Application DOS No. 2,545,223 describes thermoplastic molding materials based on styrene polymers and containing derivatives of 1,3,4-thiadiazole as highly effective flameproofing agents. Foamed polystyrene which has been flameproofed with such a highly brominated thiadiazole derivative has the disadvantage that it may exhibit a slightly yellow color due to the intrinsic absorption of the flameproofing agent. Furthermore, in some cases the additive is found to have an adverse effect on the mechanical properties of the foam.

It is an object of the present invention to extend the range of available highly effective flameproofing agents and to provide organic bromine compounds which, because of their pattern of properties, may be employed as flameproofing agents for various styrene polymers.

We have found that this object is achieved, according to the invention, by providing bromine compounds which conform to the following requirements:

(a) the compound contains in its molecule at least one heterocyclic ring with at least one nitrogen as a heteroatom, (b) the molecule contains at least one, preferably two or three,

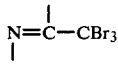

groups, where —N=C is a part of the heterocyclic ring, (c) the compound is sufficiently heat-stable at 150° C., preferably 180° C., that the weight loss on heating for one hour at this temperature is less than 1%, (d) the compound is not a derivative of 1,3,4-thiadiazole, and (e) the number of hydrogen atoms in the molecule is preferably equal to or less than the number of bromine atoms and is in particular less than 6 and in special cases is 0.

Suitable styrene polymers are polystyrene and copolymers of styrene containing up to 50% by weight of comonomers. Examples of comonomers are α-methylstyrene, acrylonitrile, and esters of acrylic acid or methacrylic acid with alcohols of 1 to 8 carbon atoms. High-impact styrene polymers which are manufactured by polymerizing styrene, with or without acrylonitrile, in the presence of elastomeric butadiene, isoprene, ethylene/propylene or acrylic ester polymers, for example high-impact polystyrene containing from 2 to 10% by weight of polybutadiene, may also be used.

Molding materials suitable for the manufacture of self-extinguishing foams are of particular importance. They preferably contain, as the blowing agent, a liquid or gaseous organic compound which does not dissolve the polymer and has a boiling point below the softening point of the polymer, for example an aliphatic or cycloaliphatic hydrocarbon, eg. propane, butane, pentane, hexane, heptane or cyclohexane, carbon dioxide or a halohydrocarbon, eg. methyl chloride, dichlorodifluoromethane or 1,2,2-trifluoro-1,1,2-trichloroethane. Mixtures of blowing agents may also be used. Advantageously, the amount of blowing agent is from 3 to 10 percent by weight, based on the molding material.

The molding material contains from 0.05 to 5, preferably from 0.1 to 3, percent by weight of a flameproofing agent, which is an organic bromine compound conforming to the above requirements. The bromine atoms in the molecule are not directly bonded to the heterocyclic ring but are present in the form of tribromomethyl side groups. It may be assumed that the C-Br bond in these groups is activated by the adjacent C=N bond in the ring, so that splitting off bromine is facilitated. In addition to the bromine in the tribromomethyl groups, the molecule may contain additional bromine, for example bonded to an aromatic carbon.

A particularly suitable bromine compound is 2,4,6-tris-(tribromomethyl)-1,3,5-triazine of the formula I

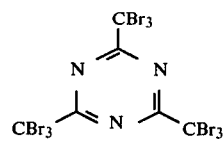

This compound may be prepared from acetonitrile either by trimerization followed by bromination in glacial acetic acid, or by bromination followed by trimerization.

Further suitable bromine compounds include, inter alia:

2-Phenyl-4,6-bis-(tribromomethyl)-1,3,5-triazine of the general formula II

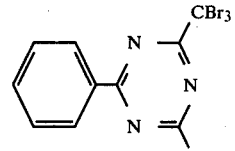

2-Phenyl-4,6-bis-(tribromomethyl)-pyrimidine

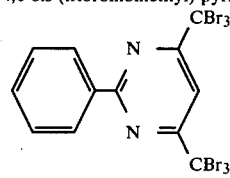

2-Dibromophenyl-4,6-bis-(tribromomethyl)-pyrimidine

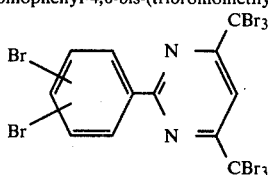

2,3-Bis-(tribromomethyl)-quinoxaline

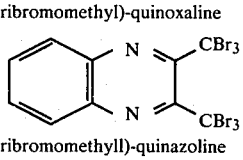

2,4-Bis-(tribromomethyl)-quinazoline

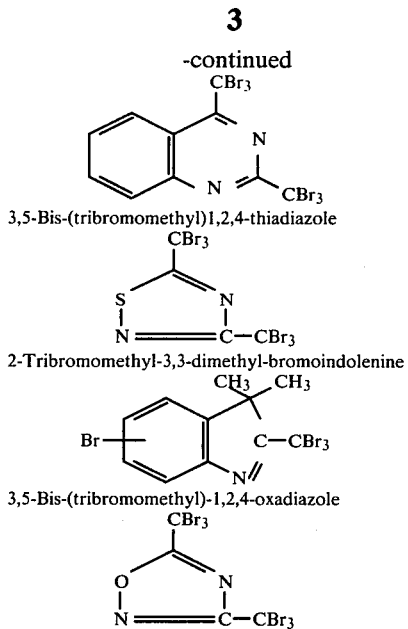

VI 3,5-Bis-(tribromomethyl)1,2,4-thiadiazole

VII 2-Tribromomethyl-3,3-dimethyl-bromoindolenine

VIII 3,5-Bis-(tribromomethyl)-1,2,4-oxadiazole

IX

The molding materials may in addition contain other, conventional, flameproofing agents, and synergistic agents. They may also contain such components as fillers, colored pigments, lubricants, plasticizers, antistatic agents, aging retardants, stabilizers or compounds which promote foaming.

The organic bromine compounds may, for example, be incorporated into the plastic on a mill, in an extruder or in a kneader. In many cases, they can even be added before polymerization of the monomer. It is also possible, for example when manufacturing cast films, to add the bromine compound to a solution of the plastic and to evaporate off the solvent.

In the case of a styrene polymer containing blowing agent, the organic bromine compound is preferably applied to the surface of the polymer. To prevent caking or sticking of the coated polystyrene particles, containing blowing agent, during further processing it is advantageous to apply a non-stick agent, in addition to the bromine compound, to the particles. Finely divided silica, preferably employed in an amount of from 0.005 to 0.1% by weight, based on the molding material, is particularly suitable for this purpose.

In subsequent process steps, the polymer containing blowing agent is foamed and the particles weld to form a molding.

The molding material may be in a finely divided form, eg. in the form of beads, granules, or coarse powders as obtained by milling mass polymers. The diameter of the particles is advantageously from 0.1 to 6 mm, preferably from 0.4 to 3 mm.

The molding materials may be processed by, for example, injection-molding, extrusion or foaming and sintering in molds, to give self-extinguishing moldings or profiles. Because of their relatively low content of organic bromine compound, the molding materials of the invention have softening points which differ only slightly from those of the polymers on which they are based.

A particular advantage of the bromine compounds employed according to the invention is their high effectiveness, even in the absence of a synergistic additive such as a peroxide or an azo derivative. Furthermore, the self-extinguishing times achieved are shorter, for a comparable bromine content, than with conventional flameproofing agents. In addition, dripping of flaming particles is substantially reduced.

The self-extinguishing moldings produced from the molding materials are tested as follows:

Moldings, of size 0.1×10×40 cm in the case of non-foamed materials and of size 0.5×15×40 cm in the case of foamed materials, are tested by holding them for 5 seconds in a 40 mm high gas flame, and the flame is then quietly removed. The time required for the molding to self-extinguish after removal of the flame is a measure of the flame resistance. The self-extinguishing times shown are mean values from 10 burning tests. Molding materials which are insufficiently flameproofed or not flameproofed at all burn away completely after removal from the flame.

In the Examples, parts and percentages are by weight.

EXAMPLE 1

30 parts of polystyrene and various amounts of organic bromine compounds of the above general formulae I to VIII are dissolved in 100 parts of methylene chloride. 3 parts of pentane are added to the solution, which is then poured out onto a glass plate, and the methylene chloride is allowed to evaporate at room temperature. The pentane remains homogeneously dispersed in the mixture. The resulting film is foamed in steam at 100° C. and the product is dried for 12 hours at 35° C. under reduced pressure. The foam sheets thus obtained are pure white if the bromine compound present is a compound according to the invention. The flame-retardant character of the sheets is tested by the above method. The results are shown in the Table.

In some cases, dicumyl peroxide was employed as a synergistic agent. In Comparative Experiments, the following bromine compounds were used:
A: Hexabromocyclododecane
B: Tetrabromothiophene
C: 5,5',7,7'-tetrabromoindigo.
D: Hexabromobenzene Table

| Experiment | Bromine compound | Amount % | Synergistic agent % | Self-extinguishing time sec |
|---|---|---|---|---|
| a | A | 1 | — | 12.0 |
| b | A | 1 | 0.05 | 3.5 |
| c | I | 1 | — | 0 |
| d | I | 0.5 | — | 0 |
| e | I | 0.25 | — | 1.5 |
| f | I | 0.25 | 0.05 | 1.0 |
| g | II | 1 | — | 0 |
| h | II | 0.5 | — | 0.5 |
| i | II | 0.25 | — | 2.0 |
| k | III | 0.64 | — | 0.25 |
| l | IV | 0.64 | — | 0.65 |
| m | V | 0.64 | — | 0.4 |
| n | VI | 0.64 | — | 0.25 |
| o | VII | 0.64 | — | 0.3 |
| p | VIII | 0.64 | — | 0.3 |
| q | C | 0.64 | — | burns |
| r | D | 0.64 | — | burns |

Experiments a, b, q and r are not in accordance with the invention. In these cases, more dripping of flaming particles is observed.

EXAMPLE 2

Example 1c is repeated, using a copolymer of 90% of styrene and 10% of acrylonitrile. The sample was immediately self-extinguishing.

EXAMPLE 3

A mixture of 100 parts of a styrene polymer prepared by polymerizing 95 parts of styrene in the presence of 5 parts of polybutadiene, and 1 part of flameproofing agent I is extruded, using an extruder with a slot die, to give a 1 mm thick sheet. The resulting sheet self-extinguishes 1.0 second after removal of the flame. If a sheet which contains 1.5 parts of hexabromocyclododecane and 0.5 part of dicumyl peroxide is tested by way of comparison, it is found to self-extinguish after 8 seconds.

EXAMPLE 4

A nozzle for injecting fluids is fitted to a twin screw extruder in the first one-third of the barrel. A mixture of 100 parts of polystyrene, 1.5 parts of flameproofing agent I and 1 part of kaolin as a seeding agent is introduced into the hopper. The temperature in the melting zone is 180° C. In the subsequent mixing zone, methyl chloride is injected through the nozzle in such amount that the mixture leaving the die head contains about 10% of methyl chloride, based on polystyrene. The temperature in the mixing zone is 160° C. In the subsequent cooling zone, the mixture is cooled to the point that on leaving the die it is at 110° C. The strand leaving the die foams up. The foam obtained has a density of about 40 g/l. A test specimen is found to be virtually instantaneously self-extinguishing.

EXAMPLE 5

400 parts of water, 0.64 part of polyvinylpyrrolidone to act as a protective colloid, and 0.6 part of sodium pyrophosphate are dissolved in a stirred vessel. 200 parts of styrene in which 14 parts of pentane, 0.75 part of benzoyl peroxide and 1 part of flameproofing agent I have first been dissolved, are then added. The mixture is heated to 70° C. in the course of 20 hours, whilst stirring, and is then kept for 15 hours at 85° C. The resulting polystyrene, containing blowing agent, is isolated, washed and dried. The particles are prefoamed by a steam treatment, stored for one day, and then further treated with steam in a mold, so as to weld them into foam polystyrene blocks. These blocks have a pure white color. Foam panels 1.5 cm thick are cut from these blocks by means of an electrically heated wire. The panels are stored at room temperature for several days and trimmed to about 30×40 cm. They are then held with their edge in a luminous gas flame, the flame is removed and the time required for the foam to self-extinguish is measured. This time is 0 second, ie. the samples virtually do not ignite.

EXAMPLE 6

Expandable polystyrene granules containing 6.4% of pentane and having a mean particle diameter of 1.5 mm are mixed with 0.3% of pulverulent flameproofing agent I, and with 0.025% of silica of mean particle size 12 μm to act as a non-stick agent, by simple tumbling in a paddle mixer for 3 minutes. On treating the granules with steam, a foam is obtained, which is found to have a self-extinguishing time of 0.5 second.

We claim:

1. A flameproof thermoplastic molding material based on a styrene polymer and containing from 0.05 to 5 percent by weight of an organic bromine compound as the flameproofing agent, with or without a blowing agent, wherein the bromine compound conforms to the following requirements:
    (a) the compound contains in its molecule at least one six membered heterocyclic ring with at least one nitrogen as a hetero-atom,
    (b) the molecule contains at least one

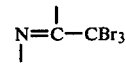

group, where —N═C— is a part of the heterocyclic ring,
    (c) the compound is sufficiently heat-stable at 150° C. that the weight loss on heating for one hour at this temperature is less than 1%, and
    (d) the compound is not a derivative of 1,3,4-thiadiazole.

2. A flameproof thermoplastic molding material as claimed in claim 1, which contains from 3 to 10 percent by weight of a liquid or gaseous organic blowing agent.

3. A flameproof thermoplastic molding material as claimed in claim 1, wherein the bromine compound is 2,4,6-tris-(tribromomethyl)-1,3,5-triazine.

* * * * *